United States Patent [19]
Robertson

[11] Patent Number: 5,245,885
[45] Date of Patent: Sep. 21, 1993

[54] BLADDER OPERATED ROBOTIC JOINT

[75] Inventor: Glen A. Robertson, Harvest, Ala.

[73] Assignee: The United States of America as represented by the Administrator of the National Aeronautics and Space Administration, Washington, D.C.

[21] Appl. No.: 912,401

[22] Filed: Jul. 13, 1992

[51] Int. Cl.$^5$ .................. B25J 18/06; B25J 15/12
[52] U.S. Cl. ...................... 74/479 B; 92/48; 92/92; 294/119.3; 623/26; 901/22; 901/37
[58] Field of Search ............ 74/479 B, 469; 92/48, 92/92; 294/119.3; 623/26; 901/22, 37

[56] References Cited

U.S. PATENT DOCUMENTS

| | | | |
|---|---|---|---|
| 3,047,257 | 7/1962 | Chester | 92/48 X |
| 3,090,049 | 5/1963 | Lanteigne | 623/26 X |
| 3,996,698 | 12/1976 | Rees et al. | 92/92 X |
| 4,689,538 | 8/1987 | Sakaguchi et al. | 901/37 X |

FOREIGN PATENT DOCUMENTS 716810 2/1980 U.S.S.R. ..................... 294/119.3

Primary Examiner—Allan D. Herrmann
Attorney, Agent, or Firm—Robert L. Broad, Jr.; Guy M. Miller; John R. Manning

[57] ABSTRACT

A robotic joint wherein an elongated support member attached at one end to a base has the other end thereof pivotally attached to one end of a lever, the other end of the lever extending away from the support member. A tension strip extends along the support member and over the other end of the lever, the ends of the tension strip being attached to the base on opposite sides of the support member. A pair of bladders positioned between the tension strip and the support member on opposite sides thereof can be inflated to apply a tensile force to the strip and cause the lever to pivot, carring with it a finger which is attached to the lever.

8 Claims, 3 Drawing Sheets

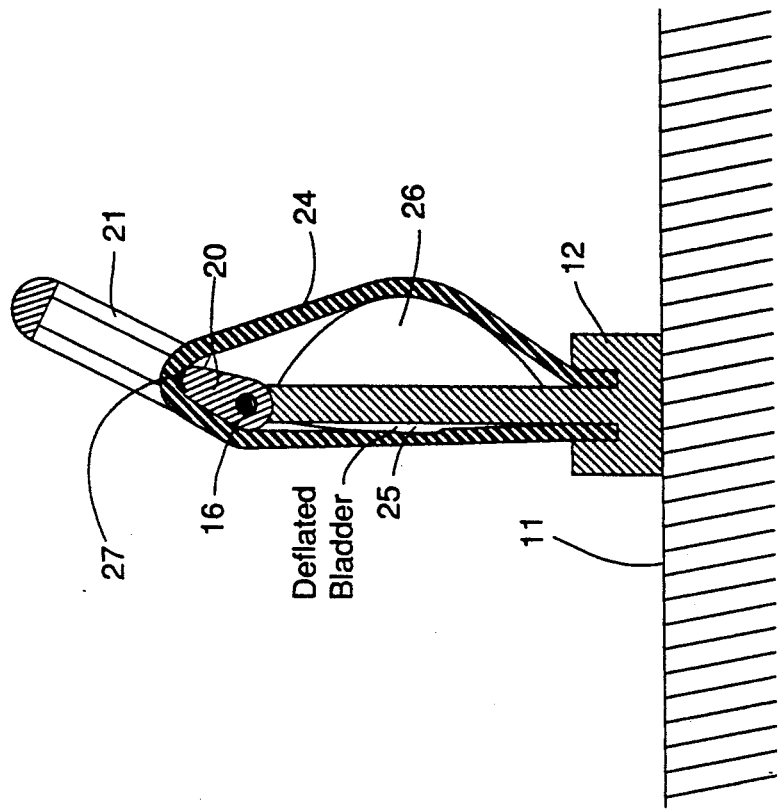
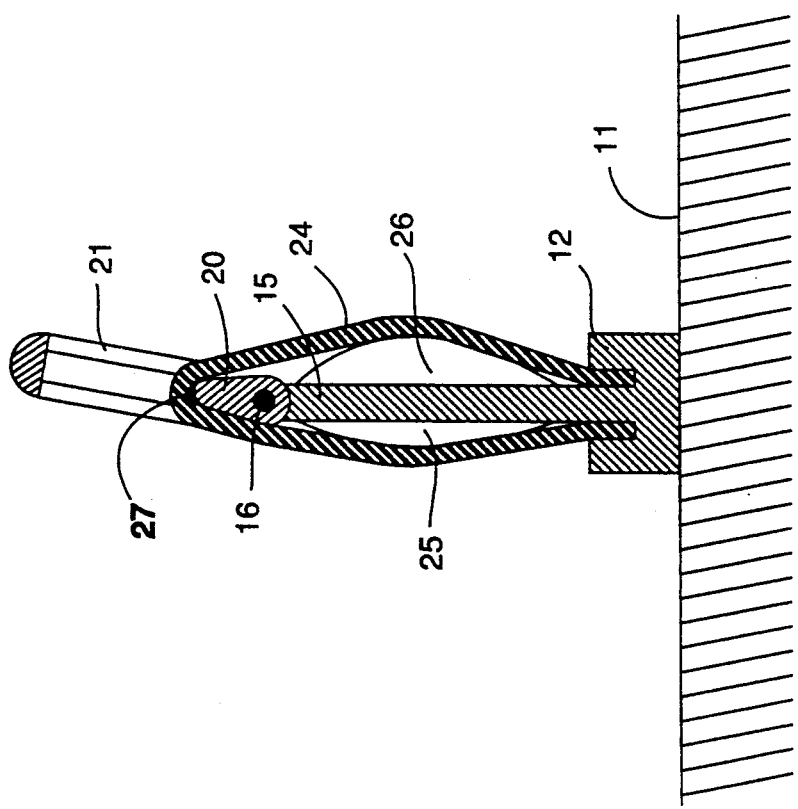

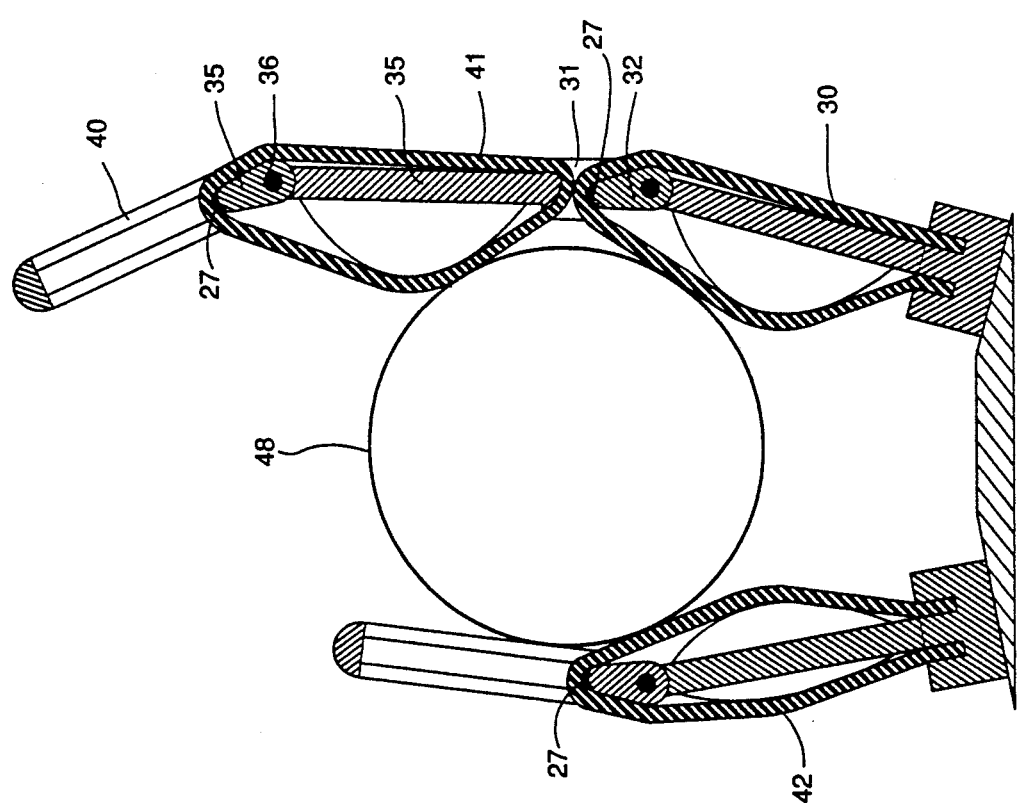

BLADDER OPERATED ROBOTIC JOINT

ORIGIN OF THE INVENTION

The invention described herein was made by an employee of the U.S. Government and may be manufactured and used by or for the Government for Governmental purposes without the payment of any royalties thereon or therefor.

BACKGROUND OF THE INVENTION

1. Field of the invention

This invention relates to joints for robotic devices.

2. Prior art

Robotic joints of various types are known, as well as apparatus for flexing them. Some known joints use fluid pressure to operate a cylinder to flex the joint. These joints are usually large and, as a result, cannot be used in many robotic applications.

Other joints are flexed by the use of solenoids or are motor driven through a gear reduction system. In some of these it is difficult to exercise a fine degree of control of how fast the joint is flexed or how far it is flexed.

SUMMARY OF THE INVENTION

A robotic joint wherein an elongated plate secured at one end to a base has at the other end thereof a lever, one end of the lever being pivotally attached to the other end of the plate. A tension strip extending along the plate and over the free end of the lever is attached to the base on opposite sides of the plate. Bladders positioned on opposite sides of the plate between the plate and the tension strip may be inflated to apply tension to the tension strip to pivot the lever and a finger which is attached to the lever.

DESCRIPTION OF THE DRAWINGS

FIGS. 3 an are side views showing the positioning of the lever and finger at different degrees of inflation of one of the bladders.

FIGS. 5 is a side view of another embodiment of the invention showing the use of multiple joints.

DETAILED DESCRIPTION OF THE INVENTION

Figure 2:
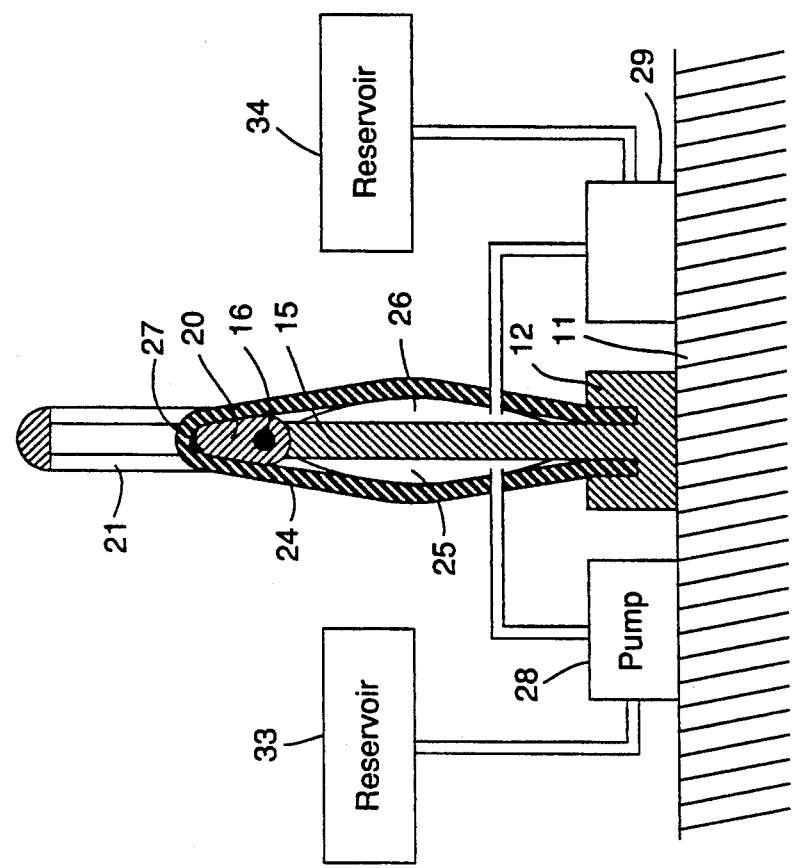
FIG. 2 is a cross sectional view taken on line 2—2 of FIG. 1 showing the positioning of the tension strip and the bladders which actuate the joint.
Figure 1:
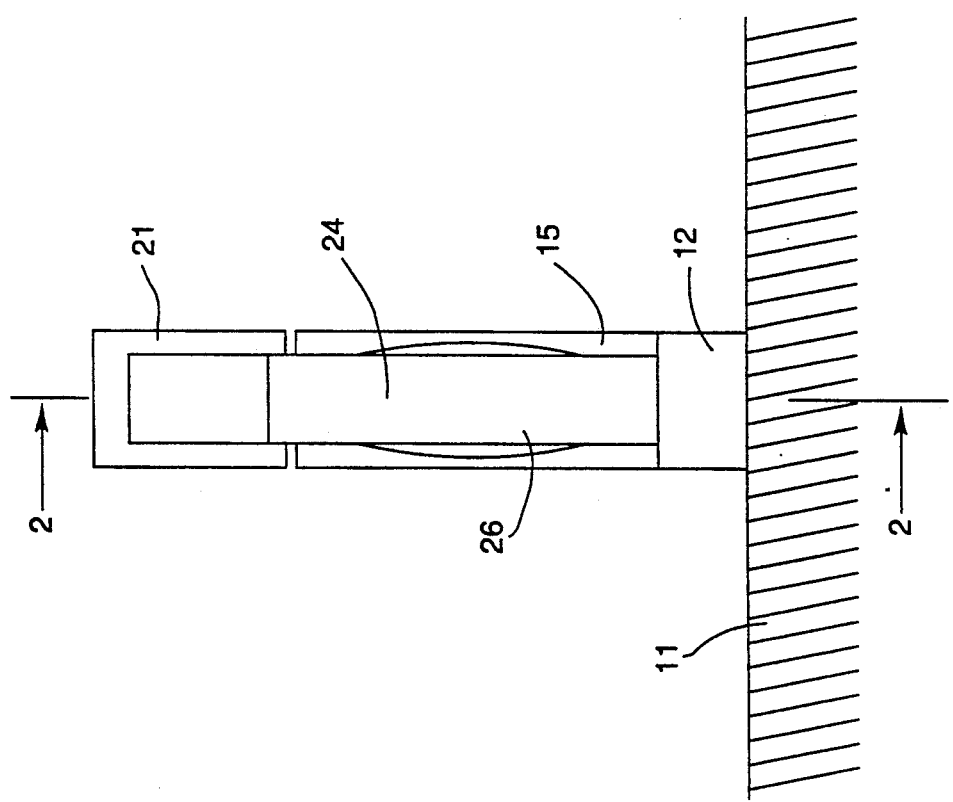
FIG. 1 is a side view of the device of this invention showing the relationship of the various parts making up the device.

Referring now in detail to the drawings, there is shown a base 11 to which is secured a support block 12 which may be considered a part of the base 11. Secured to the block 12 and extending therefrom is an elongated plate 15 having attached to the distal end thereof a pivot pin 16. A lever 20 has one end thereof pivotally mounted on the pivot pin 16, with the other end of the lever being free. A finger 21 is attached to the lever for movement with the lever.

The purpose of the finger 21 is to engage and move an object or to cooperate with a fixed member (not shown) or another robotic joint for picking up or handling an object (not shown). The finger 21 may be shaped as shown or it may be shaped in whatever manner is best suited for task it is to perform.

A tension band or strip 24 extends up one side of the plate 15, over the free end of the lever 20 and down the other side of the plate 15 to the support block 12, with the ends of the tension strip being secured to the support block on opposite sides of the plate 15. The tension strip 24 should be under at least a small amount of tension so that there is no slack in it.

Positioned between the tension strip 24 and the plate 15 on opposite sides of the plate are a pair of inflatable bladders 25 and 26 of a known type. The purpose of the bladders is to move the lever 20 to move the finger 21 to the desired position, this being accomplished by inflating one of the bladders 25 and 26 to a greater degree than the other. This is illustrated in FIGS. 3 and 4, where the bladder 26 is inflated to different degrees. It can readily be seen that when the bladder 26 is inflated to a greater degree, as shown in FIG. 4, the finger 21 is moved a greater distance.

A pair of pumps 28 and 29 (FIG. 2) connected to reservoirs 33 and 24 may be used to inflate the bladders 25 and 26, using either compressed air or a fluid such as oil.

The tension strip may be a band woven from nylon or other strands or it may be a band of rubber. Other materials may be used for the tension strip but it should be understood that it is preferred that the strip have some elasticity. The reason for this is that the length of the strip will, if the bladders 25 and 26 are not operated in concert (one bladder deflated as the other is inflated), change as the lever is moved from one position to another and it is desirable that there be no slack in the strip during operation.

If an elastic material is used for the tension strip it will aid in assuring that the lever 20 will pivot smoothly and return to center upon deflation of the bladders. If a non-elastic material is used for the tension strip it may be necessary to deflate one of the bladders as the other is being inflated in order to have the lever 20 return to center. In either case, the tension strip should be made of a material which will not permanently change length over a period of operation.

In the preferred embodiment, the end of the lever 20 is secured to the tension strip 24 such that the strip will not slide over the end of the lever. This may done by using an adhesive to secure the two together, the adhesive being indicated by reference numeral 27 in FIGS. 2-5.

FIG. 5 shows another embodiment of the invention where two of the robotic joints are connected in series to provide for a greater range of movement. A first robotic joint 30 such as that described above is provided with a finger 31 secured to a lever 32 which carries a plate 35. The plate 35 has at its distal end a lever 35 pivotally mounted on a pivot pin 36 secured to the plate 35, with a finger 40 being attached to and carried by the lever 35

A tension strip 41 of the type described above passes around the plate 35 and over the free end of the lever 35. Inflatable bladders 44 and 45 positioned between the tension strip 41 and the plate 35 on opposite sides of the plate serve to move the finger 40 in the manner described above. This robotic joint can be used in cooperation with a fixed member (not shown) or another robotic joint 42 of the type described above to handle a large object 48.

What is claimed is:

1. A robotic joint, comprising, a. a base, b. a support member secured to and extending from the base, c. a lever having first and second ends, the first end of said lever being pivotally attached to the support member with the second end of the lever extending away from said support member, d. a finger secured to the lever for movement therewith, e. a tension strip having opposite ends secured to the base on opposite sides of the support member, said tension strip extending along the support member and over the second end of the lever, and f. an inflatable bladder positioned between the support member and the tension strip such that when the bladder is inflated it applies a tensile force to the tension strip to pivot the lever and the finger in the direction of the bladder.

2. The apparatus of claim 1 wherein the support member is an elongated plate.

3. The apparatus of claim 2 wherein the tension strip is elastic and has a length such that said strip is elongated when the lever and the plate lie in the same plane.

4. The apparatus of claim 3 wherein the tension strip is a strip woven from strands.

5. The apparatus of claim 3 wherein the tension strip is in the form of a band of rubber.

6. The apparatus of claim 3 wherein a plurality of said robotic joints are connected together in series.

7. A robotic joint, comprising a. a base, b. a support member secured to the base and extending therefrom, c. a lever having first and second ends, the first end of the lever being pivotally attached to the support member with the second end of the lever extending away from said support member, d. a finger secured to the lever for movement therewith, e. a tension strip having opposite ends secured to the base on opposite sides of the support member, said tension strip extending along the support member and over the second end of the lever, and f. a pair of inflatable bladders positioned between the support member and the tension strip on opposite sides of the support member such that when one of the bladders is inflated to a greater degree than the other the tension strip will pivot the lever and the finger in the direction of said one bladder.

8. The apparatus of claim 7 wherein each of the bladders is connected through a pump to a reservoir of fluid

* * * * *